United States Patent [19]

Egner-Walter et al.

[11] Patent Number: 4,773,112
[45] Date of Patent: Sep. 27, 1988

[54] RECIPROCATING WINDSHIELD WIPER SYSTEM

[75] Inventors: Bruno Egner-Walter, Heilbronn; Eckhardt Schmid, Brackenheim; Wolfgang Scholl, Gemmrigheim, all of Fed. Rep. of Germany

[73] Assignee: SWF Auto-Electric GmbH, Bietigheim-Bissingen, Fed. Rep. of Germany

[21] Appl. No.: 3,575

[22] Filed: Jan. 15, 1987

[30] Foreign Application Priority Data

Jan. 15, 1986 [DE] Fed. Rep. of Germany ....... 3600936

[51] Int. Cl.4 .................................................. B60S 1/26
[52] U.S. Cl. .................................. 15/250.21; 384/38
[58] Field of Search ........... 15/250.21, 250.23, 250.29, 15/250.31, 250.35; 384/38, 901

[56] References Cited

U.S. PATENT DOCUMENTS

| 4,163,590 | 8/1979 | Dwyer et al. | 384/38 |
| 4,625,359 | 12/1986 | Egner-Walter et al. | 15/250.21 |
| 4,648,148 | 3/1987 | Egner-Walter et al. | 15/250.21 |

FOREIGN PATENT DOCUMENTS 3409256 9/1985 Fed. Rep. of Germany ... 15/250.21

*Primary Examiner*—Peter Feldman
*Attorney, Agent, or Firm*—James B. Raden; Robert P. Seitter

[57] ABSTRACT

In a reciprocating wiper system for motor vehicles with a piston adjustably guided in a housing a slide fixed on the housing in a torsionally firm way is provided as a protection against twisting, the slide is longitudinally guided on a guide element fixed to the housing. To compensate for unavoidable tolerances of position and shape of the guide elements and the slide a calotte-shaped bearing body is fittingly guided on the guide element. The bearing body is movably mounted with play in the radial direction in a calotte-shaped receiver on the slide.

15 Claims, 2 Drawing Sheets

Fig. 1

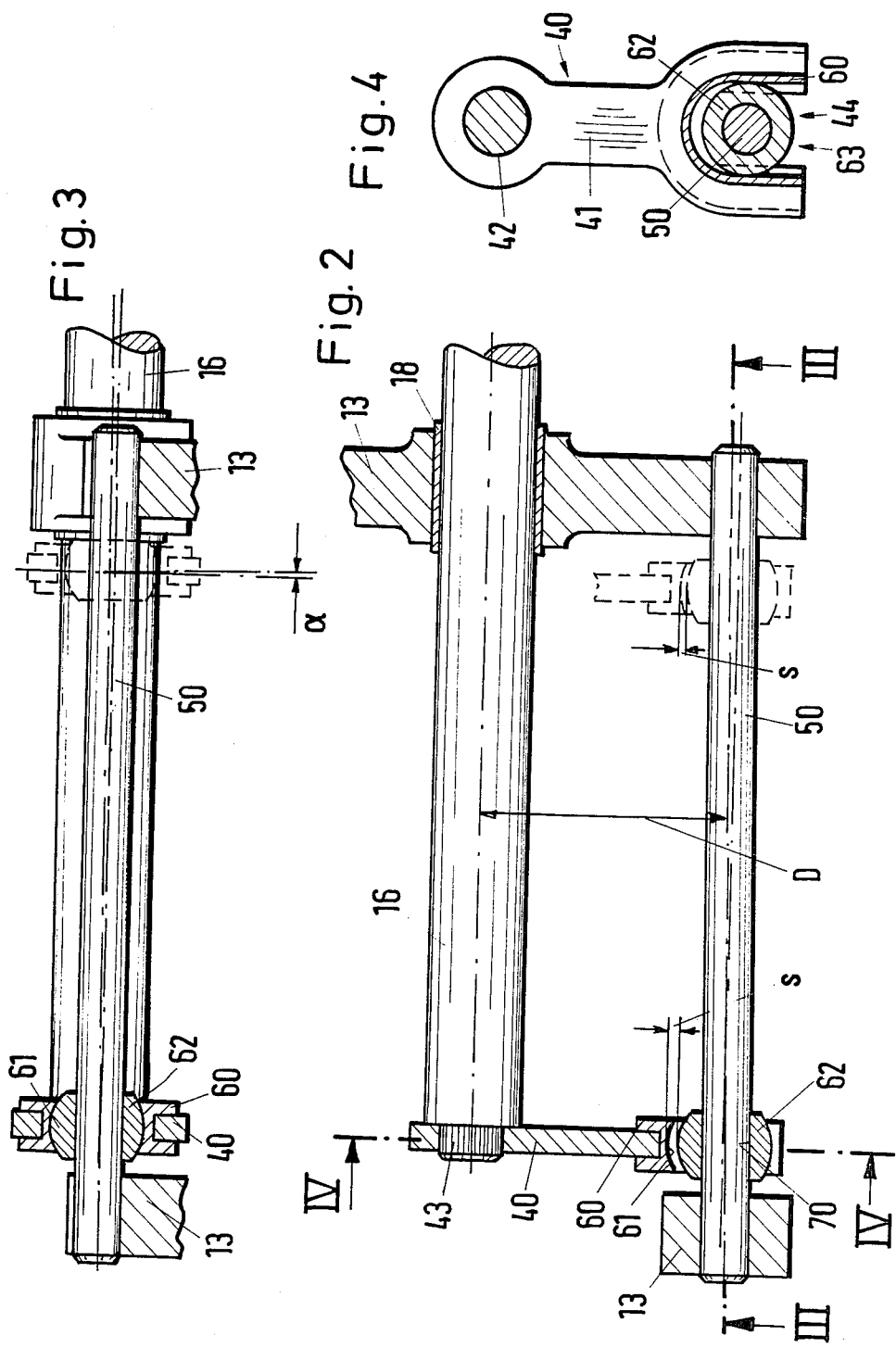

RECIPROCATING WINDSHIELD WIPER SYSTEM

BACKGROUND OF THE INVENTION

This invention pertains to an improved reciprocating wiper system for motor vehicles. In particular, the invention pertains to such a system comprising a piston which is displaceably guided in a housing, and having a slide fixed on the piston in a manner protected against twisting. The slide projects radially from the piston and is longitudinally guided on a guide element fixed to the housing.

In many applications of a device of this kind the piston has to be guided in such a way that it cannot turn about its longitudinal axis during its adjusting motion. This applies also for so-called reciprocating wiper systems in which during the pendulum-type motion the windscreen wiper fixed on the piston is retracted and extended in the radial direction, so that the corner areas of a windscreen can also be reached by the wiper blade of the windscreen wiper.

German specification OS No. 3,409,256 describes a reciprocating wiper system in which a slide is fixed on the piston in a manner protected against twisting. The slide includes guide grooves in its diametrically opposite end areas. Guide elements fixed on the housing in the shape of flat rails engage the guide grooves. The depth of the grooves in the guide block is greater than the portion of the guide rails fittingly protecting into the said grooves. The guide rails may be considered as defining a plane. If in that plane the guide rails are not aligned accurately parallel to each other and parallel to the adjusting direction of the piston this does not affect the smooth running of the piston, because the guide rails can more or less dip into the grooves on the guide block. However if the guide rails were arranged in a skew wise manner, tightness of the piston could not be excluded in the case of a rigid connection between slide and piston. To prevent this disadvantage the slide is held on the piston to be movable in one direction, so that these detrimental tolerances with regard to the position of the guide rails can be compensated for. For this purpose the piston is formed as a pivot with cheeks at its end, which is put into a somewhat larger recess of the slide. Thus in these constructions tolerances of shape and position of the guide elements and of the slide which are unavoidable in practice are compensated for, so that the piston can be smoothly adjusted. This also has a favorable effect on the service life of a device of this kind. However it is true that the production of a protection against twisting for the piston is involved with considerable difficulties and costs. The guide elements have indeed to be worked in a special way in order to provide for the necessary smooth surface. This is very costly in the case of flat guide elements with the shape of rails. Because of the piston end formed as a pivot with cheeks it is also linked with considerable costs to produce a connection with play between piston and slide. The slide has a relatively complicated space form and it is therefore not either inexpensive to produce it. Furthermore additional elements are necessary to fix the slide in the adjusting direction.

Thus the present invention is based on the problem of simplifying a device of the initially mentioned kind with regard to a protection against twisting for the piston and improving it with regard to its guide properties.

SUMMARY OF THE INVENTION

In a reciprocating wiper system for motor vehicles with a piston adjustably guided in a housing a slide fixed on the housing in a torsionally firm way is provided as a protection against twisting, the slide is longitudinally guided on a guide element fixed to the housing. To compensate for unavoidable tolerances of position and shape of the guide element and the slide a calotte-shaped bearing body is fittingly guided on the guide element. The bearing body is movably mounted with play in the radial direction in a calotte-shaped receiver on the side.

The present invention is based on the idea that compensation for play in different directions can be functionally combined by providing a calotte-shaped bearing body which is movably mounted with play in the radial direction in a calotte-shaped receiver on the slide. A design of this kind results in considerable cost advantages. Now the slide can be fixed on the piston in a dimensionally stable way and in this area no guide surfaces are necessary. Thus it is possible to press the slide directly onto a knurled end of the piston, so that the expensive production of a pivot with cheeks is not necessary. The production of a calotte-shaped receiver on the slide is possible at favorable costs, because this is a method which has also been used in serial production of gearings for years, especially for windscreen wiper systems. Parts produced in serial production can also be used as bearing bodies, so that they can be procured at favorable costs. Thus in comparison with the known construction the production of this protection against twisting is considerably simplified and cheaper.

The guide and bearing properties are also improved, because now the bearing body cylindrically encompasses the guide element, so that in comparison with the known construction the surface pressure and, consequently, the wear are reduced. Thus a large-area guidance is provided between the very parts which slide along each other during the relatively large stroke of the piston. However an excessive wear between the bearing body and the calotte-shaped receiver on the slide has not to be feared, because here only comparatively small relative displacements appear in the case of tolerances of shape or position of the guide elements and the slide.

According to an advantageous development of the invention a rod with a circular cross-section is used as a guide element, because a rod of this kind can be simply grinded as far as production engineering is concerned, so that no excessive friction losses appear between the said guide element and the bearing body.

The ball cup on the slide will preferably be formed from an elastic material and the bearing body will be locked in it. Thus the bearing body is mounted in this ball cup free from play with regard to a load appearing upon twisting of the piston.

The calotte-shaped receiver could be closed just as the usual ball sockets used for gearing linkages, however this could result in mounting problems. Therefore a construction is preferred in which the said calotte-shaped receiver on the slide in the radial direction has a mouth-shaped opening for entering the bearing body. Thus this makes possible to enter the bearing body mounted on the guide rod laterally into the calotte-shaped receiver. The slide itself consists of a metallic lever pressed onto the piston in a manner protected against twisting, onto which lever the plastics ball cup is injection-molded. A construction could also be conceived in which slide with the ball cup is directly integrally injection-molded onto the piston from plastics material, so that the production costs can be further reduced.

BRIEF DESCRIPTION OF THE DRAWING

The invention and its advantageous developments are described below in detail by way of the embodiments shown in the accompanying drawing, in which:

FIG. 1 is a longitudinal section through the housing of a reciprocating wiper system to be driven in pendulum-fashion by way of a wiper shaft comprising a piston mounted in the housing in a longitudinally displaceable way and a slide fixed on the piston;

FIG. 2 is a partial view of the device of FIG. 1 in the direction of arrow A;

FIG. 3 is a section taken on the line III—III of FIG. 2; and

FIG. 4 is a section taken on the line IV—IV in FIG. 2.

DETAILED DESCRIPTION

Figure 1:
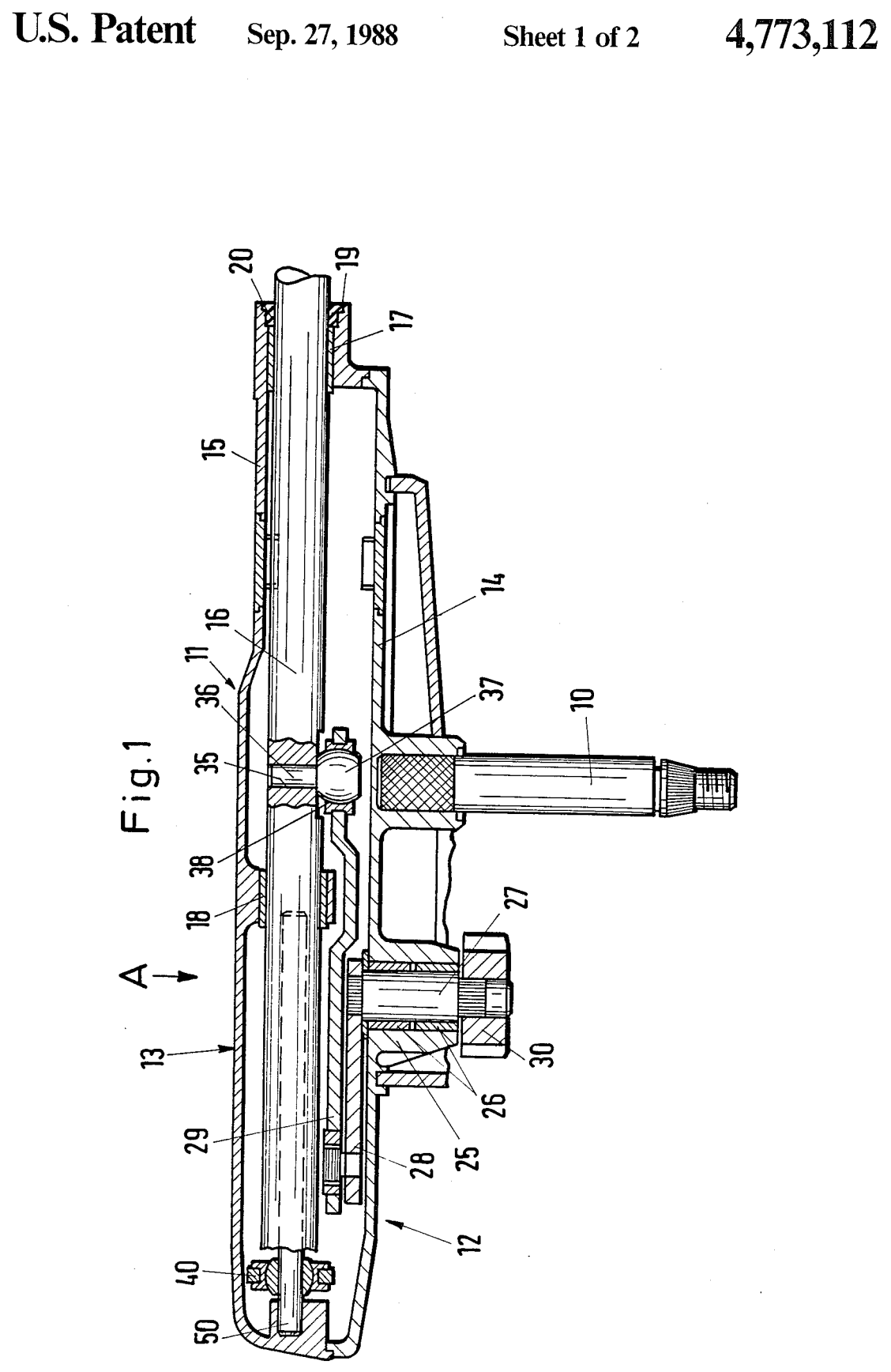

In the wiper system shown in FIG. 1, a housing 11 is mounted on a wiper shaft 10 in a manner protected against twisting, which housing is part of a wiper arm and is composed of two component parts, namely a base plate 12 and a top 13. The base plate 12 is fixed on the wiper shaft 10. The housing 11 has a flat shape with a bottom 14 on the base plate 12 and a covering 15 on the top 13. Within the housing 11 is cylindrical piston 16 which is mounted on two bearings 17 and 18 in such a way that piston 16 is capable of being displaced in a radial direction relative to the axis of rotation of the wiper shaft 10. The piston 16 projects from the housing 11 at its front side 19. The front bearing 17 adjoins directly the interior front side 19 of the housing 11. In front of bearing 17 there is only a sealing element 20 which is intended to prevent dirt from entering between housing 11 and piston 16 into the interior of the housing. The rear bearing 18 has a spacing from the bearing 17 which is somewhat larger than the stroke provided for the piston.

Behind the wiper shaft 10 and below the piston 16 (seen from the front side 19 of the housing 11) the base plate 12 has a sleeve 25 which substantially extends away from the interior of the housing 11 to the outside. Into the sleeve 25 two bearing bushes 26 are inserted with press fit, which bearing bushes receive a shaft 27. Shaft 27 projects on one side into the interior of the housing 11 and on the other side projects over the sleeve 25 of the base plate 12. Within the housing 11 one of the projecting knurled parts carries a crank 28 in a manner protected against twisting, onto the free end of which crank a coupling rod 29 is rotatably articulated. On the other knurled portion of the shaft 27 a toothed wheel 30 is fixed in a manner protected against twisting. This toothed wheel 30 is driven when the wiper system is operated.

Between the two bearings 17 and 18 the piston 16 has a bore 35, into which a ball pin 36 is pressed. The bore 35 and thus the ball pin 36, too, extend substantially perpendicularly to the bottom 14 of the base plate 12 and to the covering 15 of the top 13. On the side of the piston 16 adjacent to the bottom 14 the ball pin 36 projects beyond the piston 16 by means of the spherical segment 37. Into one end of the coupling rod 29 positioned between the crank 28 and the piston 16 there is a buttoned ball cup segment into which is pressed the spherical segment 37 of the ball pin 36. Thus during operation the rotary motion of the toothed wheel 30 is transformed into a to-and-fro movement of the piston 16.

After mounting on the motor vehicle further parts of a wiper arm are fixed on the piston 16, which parts carry a wiper blade. Because the wiper blade, when the system is operated, incurs resistance to movement across a motor vehicle windscreen, a torque therefore acts upon the piston 16, which tends to turn the piston about an axis in its longitudinal direction. A lateral movement of the coupling rod 29 on the piston 16 also produces torsional forces acting upon the piston. In order to compensate for the torque acting upon the piston 16 at the rear end of the piston 16 there is held in a manner protected against twisting a slide 40 which radially projects from the piston and is longitudinally guided on a guide element 50 fixed to the housing.

The construction of the protection against twisting for the piston 16 is described below by way of FIGS. 2, 3 and 4. The slide 40 consists of a metal sheet 41 with a bore 42, into which the knurled end portion 43 of the piston 16 is pressed. Thus a dimensionally stable connection between the slide 40 and the piston 16 is effected without any additional parts. As FIG. 2 shows the slide 40 extends substantially perpendicularly or radially to the piston 16. The end area as shown in FIG. 4, slide 40 has a U-shaped recess 44 with an open rim into which a plastic ball cup 60 is injection-molded in a manner known in itself. In the receiver 61 of the ball cup 60, as shown in FIG. 3, is fittingly sealed a calotte-shaped bearing body 62. One can see from FIG. 3 that with regard to the direction of a load appearing upon twisting of the piston 16 about its longitudinal axis, that the bearing body 62 is supported free from play in the ball cup 60. The bearing body 62 can however be displaced in the ball cup 60 in the radial direction, i.e. in the longitudinal direction of the slide 40 or tranversely to the axis of the piston 16, which fact has been indicated in FIG. 2, because a gap S is provided between the surfaces of the bearing body 62 and the receiver 61. Thus the bearing body 62 is movably mounted with play in the radial direction in the calotte-shaped receiver 61 on the slide. The bearing body 62 has a bore 70 as shown in FIG. 3 through which extends rod 50 having a circular cross-section serving as guide element.

In FIGS. 2 and 3 the mounting tolerances of the guide rod 50 fixed in the housing 13 are shown in an exaggerated way. From FIG. 2 it can be seen that the spacing D between the axial direction of the piston 16 and the guide rod 50 changes during an adjusting motion of the piston 16. However this change in position of the guide rod 50 is compensated for due to the radial play between bearing body 62 and receiver 61 of the ball cup 60, so that there is a minimal probability of jamming. This can be seen from the fact that in the other end position of the slide 40, in FIG. 2 that which has been indicated by broken lines, the size of the gap S is reduced.

In FIG. 3 it has been indicated that the guide rod 50 is arranged in a skewed to the axial direction of the piston 16. This tolerance of position is also compensated for due to the joint connection between bearing body 62 and the receiver 61 on slide 40, because the calotte-shaped bearing body 62 can be smoothly displaced by an angle of correction in the calotte-shaped receiver on the slide 40. Upon such a tolerance of position of the guide rod 50 the piston 16 is indeed turned about its longitudinal axis. However, the angle of rotation is relatively small and of no significance for practical purposes.

In principle the ball cup 60 can be closed in a known manner, thus similar to the ball cup segment 38, in which case however the cross-section deviates from the circular form because of the necessary radial play. However on grounds of mounting it is necessary so-to-speak only to injection-mold a partial area of a ball cup of this kind onto the slide 40 in order to provide that the bearing body can be laterally inserted. Therefore in the preferred embodiment shown in the drawing the said ball cup 60 has a mouth-shaped opening 63 in the radial direction as FIG. 4 shows. This fact can also be expressed by saying that the U-shaped recess 44 is lined in a calotte-shaped manner by injection-molding with an elastic material.

The drawings shown an embodiment in which the adjusting direction of the piston is predetermined by the arrangement of the two bearings 17 and 18, because these two bearings are fixed on the housing in a non-adjustable way. This is why in this construction only a single-arm slide is necessary as a protection against twisting. However the basic idea of the present invention can also be realized in systems having the piston directly guided in a preferably self-adjusting calotte-type bearing in which the slide is two-armed and longitudinally guided on the guide rod in both end areas.

What is claimed is:

1. A reciprocating wiper system for motor vehicles, comprising;
    a housing;
    a piston displaceably guided in said housing;
    a slide fixed on said piston in a manner protected against twisting, said slide projecting radially from said piston;
    a single guide element fixed to said housing and longitudinally guiding said slide;
    said guide element xtending fittingly through a bore of a calotte-shaped bearing body, said calotte-shaped bearing body being housed in a calotte-shaped receiver on said slide;
    said bearing body being fixed in the longitudinal direction of said piston and said bearing body being movably mounted with play in a radial direction relative to that of said piston.

2. A device in accordance with claim 1, wherein:
    said guide element is a rod with a circular cross-section.

3. A device in accordance with claim 1, wherein:
    a ball cup is provided on said slide for receiving said bearing body.

4. A device according to claim 2 wherein:
    said ball cup comprises an elastic material.

5. A device according to claim 1 wherein said calotte-shaped receiver has a mouth-shaped opening in its radial direction for receiving said bearing body.

6. A device according to claim 2 wherein said calotte-shaped receiver has a mouth-shaped opening in its radial direction for receiving said bearing body.

7. A device according to claim 3 wherein said calotte-shaped receiver has a mouth-shaped opening in its radial direction for receiving said bearing body.

8. A device according to claim 4 wherein said calotte-shaped receiver has a mouth-shaped opening in its radial direction for receiving said bearing body.

9. A device according to claim 3 wherein:
    said slide comprises a metal part which is pressed upon said piston in a manner protected against twisting, said ball cup being injection-molded onto said slide.

10. A device according to claim 4 wherein:
    said slide comprises a metal part which is pressed upon said piston in a manner protected against twisting, said ball cup being injection-molded onto said slide.

11. A device according to claim 5 wherein:
    said slide comprises a metal part which is pressed upon said piston in a manner protected against twisting, said ball cup being injection-molded onto said slide.

12. A device according to claim 6 wherein:
    said slide comprises a metal part which is pressed upon said piston in a manner protected against twisting, said ball cup being injection molded onto said slide.

13. A device according to claim 7 wherein:
    said slide comprises a metal part which is pressed upon said piston in a manner protected against twisting, said ball cup being injection-molded onto said slide.

14. A device according to claim 8 wherein:
    said slide comprises a metal part which is pressed upon said piston in a manner protected against twisting, said ball cup being injection molded onto said slide.

15. A device according to claim 3 wherein: said ball cup comprises plastic material.

* * * * *